US005477365A

United States Patent [19]

Knestel

[11] Patent Number: 5,477,365

[45] Date of Patent: Dec. 19, 1995

[54] AUTOMOTIVE INSPECTION LAMP

[75] Inventor: Anton Knestel, Hopferbach, Germany

[73] Assignee: Maschinenbau Haldenwang GmbH & Co KG, Germany

[21] Appl. No.: 197,489

[22] Filed: Feb. 16, 1994

[30] Foreign Application Priority Data

Feb. 17, 1993 [DE] Germany ............................ 9302310 U

[51] Int. Cl.$^{6}$ ...................................................... H04B 10/10

[52] U.S. Cl. ........................... 359/142; 359/147; 455/100

[58] Field of Search .................................... 359/142, 146, 359/147, 148, 145; 455/66, 68, 92, 100

[56] References Cited

U.S. PATENT DOCUMENTS

| | | | |
|---|---|---|---|
| D. 317,310 | 6/1991 | Schwartz | D14/218 |
| 3,294,901 | 12/1966 | Stanghi | 359/146 |
| 3,325,593 | 6/1967 | Platt | 359/146 |
| 3,636,514 | 1/1972 | Burgess | 359/147 |
| 3,750,023 | 7/1973 | Weissenborn | 455/100 |
| 3,940,701 | 2/1976 | Novitski | 359/146 |
| 4,514,732 | 4/1985 | Hayes | 359/142 |
| 5,319,487 | 6/1994 | Sato | 359/146 |

*Primary Examiner*—Leslie Pascal
*Attorney, Agent, or Firm*—Dale Curtis Hogue, Sr.; Marks & Murase

[57] ABSTRACT

A hand lamp for examining e.g. underbodies, brakes and wheel bearings of motor vehicles in test stands comprises a housing with a grip, at least one energy storage disposed in said housing, a light source with reflector, and switching elements for switching said light source on and off, wherein on the housing (1) at least one transmitting element (8) for remote control of specific components of the test stand is arranged which is connected to the energy storage (4) and the actuating switches (11, 12) via an electric control circuit (10).

12 Claims, 2 Drawing Sheets

AUTOMOTIVE INSPECTION LAMP

BACKGROUND OF THE INVENTION

1. Field of the Invention

The invention relates to a hand lamp for examining underbodies, wheel bearings and suspensions of motor vehicles in test stands. More specifically, the invention relates to a hand lamp comprising a housing with a handle, at least one power source disposed in said housing and, a light source with reflector and switching elements electrically coupled to the power source and to the light source, for switching the hand lamp on and off.

2. Related Art

For inspection of the underbodies of motor vehicles, in particular for examining the play of the wheel bearings, the steering linkage, etc., special test stands as described for instance in German patents 3,402,812 and 3,427,701 are used. These test stands, which, as a rule, are disposed above pits, have support plates for the wheels of the motor vehicle to be inspected. The support plates may be displaced by means of hydraulic cylinders or other linear drives for horizontal longitudinal and transverse movements. By an intermittant actuation of the linear drives the wheels are subjected to a vibration movement. A person in the pit performing the inspection can determine the respective state of the various subassemblies of the motor vehicle through visual observation. Because of the unfavourable light conditions in such pits, highly luminous hand torches are used regularly. The person inspecting must use separate devices to control the test stand and the hand torches, which entails a greater inspection expenditure in terms of time and leads to complications in handling the control device and the torch or hand lamp, respectively.

The problem addressed by the present invention is simplification inspection of the underbodies of motor vehicles when using a test stand.

SUMMARY OF THE INVENTION

This problem is solved by an inventive hand lamp comprising a housing with a handle, at least one power source, such as an accumulator (battery), exchangeably disposed in the housing, and a highly luminous light source with a reflector and electric switching elements. The housing includes one or more transmitting elements for the remote control of specific components of a test stand. The transmitting elements cooperate with receivers of the control unit of the test stand and are connected to the energy storage of the hand lamp and to actuating switches via an electric control circuit.

The hand lamp according to the invention thus allows single-handed operation of a light source and control of the driving units of the test stand. In particular, the hand lamp allows control of the displacement cylinders for the support plates of a plate-type test stand. The person inspecting a vehicle, who is, either standing in a pit or lying under the vehicle, is able to illuminate the various subassemblies of the motor vehicle by means of the hand lamp in a controlled way and, at the same time, actuate the various units of the test stand without having to change his position. This facilitates and shortens the entire inspection process considerably.

According to an advantageous embodiment of the invention, several transmitting elements are disposed around the outer circumference of the lamp housing such that for operation of the test stand the hand lamp need not be directed at or in close proximity to the control unit; in fact, control operation of the test stand is possible with the lamp remaining located in the area where it is being used and without interrupting illumination of the vehicle.

In order to prevent other adjoining test stands in the same area from being activated by the signals of the transmitting elements as well, in addition to an IC, the control circuit includes encoding members that are adapted to corresponding encoding elements in the control unit of the respectively associated test stand and that modulate the signals generated by the IC with respect to timing signals, frequency or amplitude.

According to an advantageous embodiment of the invention spring-loaded flip switches known per se may be used as actuating switches, which are disposed in the gripping area of the housing wall respectively the grip, and which can activate the respective transmitting elements as long as they are pressed down with the finger against the force of the spring. Conveniently, these flip switches are mounted on a joint support, for instance a suitable board, to which the IC and the further electric components are secured as well.

BRIEF DESCRIPTION OF THE DRAWINGS

The invention is better understood by reading the following Detailed Description of the Preferred Embodiments with reference to the accompanying drawing figures, in which like reference numerals refer to like elements throughout, and in which.

Figure 1:
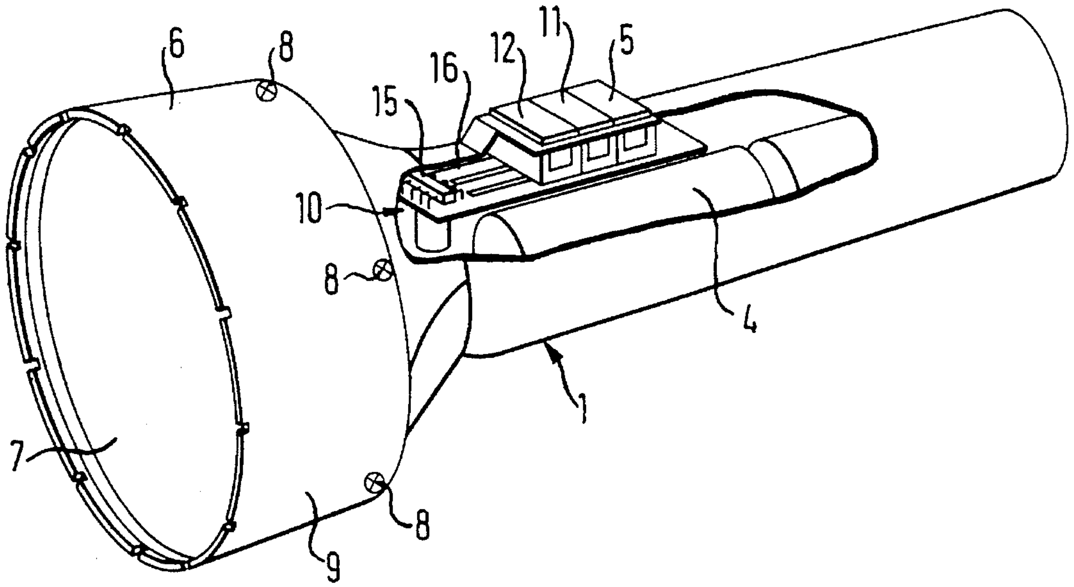
FIG. 1 illustrates a perspective view of the inventive hand lamp executed as a so-called electric torch.
Figure 2:
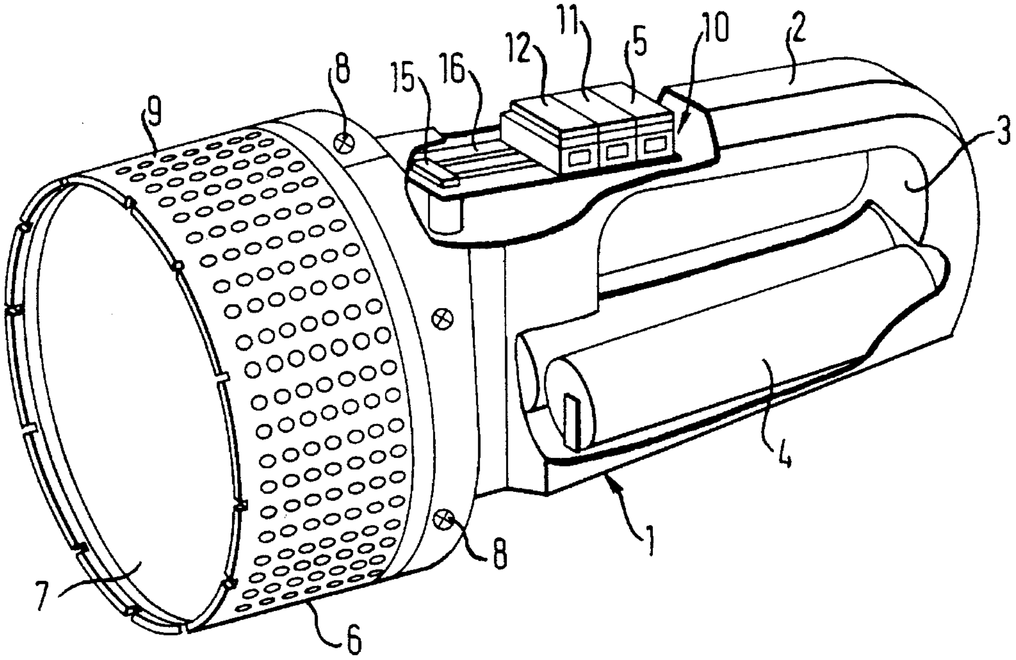
FIG. 2 illustrates a perspective view of an alternative embodiment of the hand lamp.

The hand lamps shown in FIGS. 1 and 2 are well-known lamp types which are largely identical as for their basic technical concept and which merely differ from one another with respect to their dimensions and their handle design. The hand lamps have a housing 1 which, in the embodiment according to FIG. 1, is hollow-cylindrical at least in the rear portion and forms the handle.

In the embodiment according to FIG. 2 the handle 2 forms an integral part with the housing 1 and defines a handle opening 3. A power source, such as a battery 4, is releasably housed in housing 1 and is electrically connected to a light source via lines (not shown) and a switch 5 mounted in the housing wall. The light source is mounted in the front end section 6 of the housing 1 and surrounded by a funnel-shaped reflector 7. On the circumferential wall of the housing 1, at the rear section of the front end section 9 of the housing surrounding the reflector, a plurality of transmitting elements 8 are uniformly disposed in an angularly offset fashion and are connected by electric lines (not shown) to an assembly 10 composed of electronic components. Assembly 10 forms an electric control circuit and is connected to the power source 4 via first and second switches 11, 12 such as spring-loaded flip switches. Assembly 10 further includes a board-type carrier plate 16 on which an IC element 15 is premounted together with other electronic components and first and second switches 11, 12. Assembly 10 is inserted in a corresponding recess in the housing wall, which, in the case of the embodiment according to FIG. 1, is formed in the rod-shaped part of the housing, and according to the embodiment illustrated in FIG. 2, on the upper side of the handle 2.

Figure 3B:
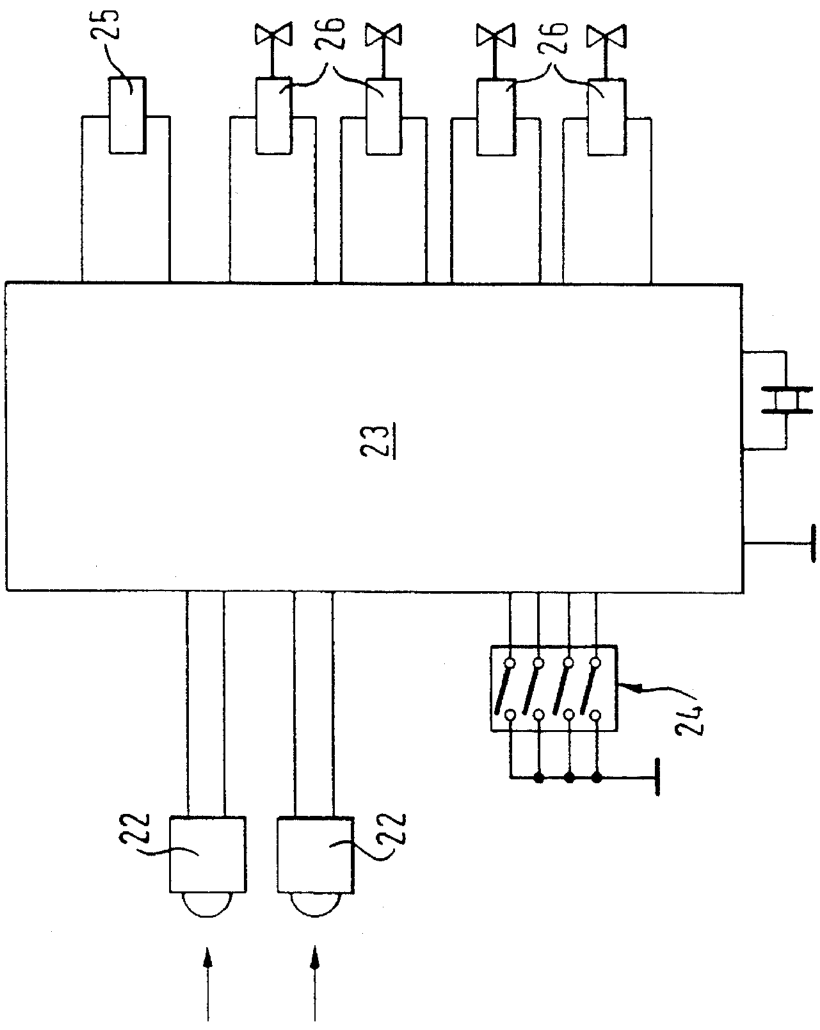
FIG. 3B is an electric circuit diagram of the switching elements used in the test stand.
Figure 3A:
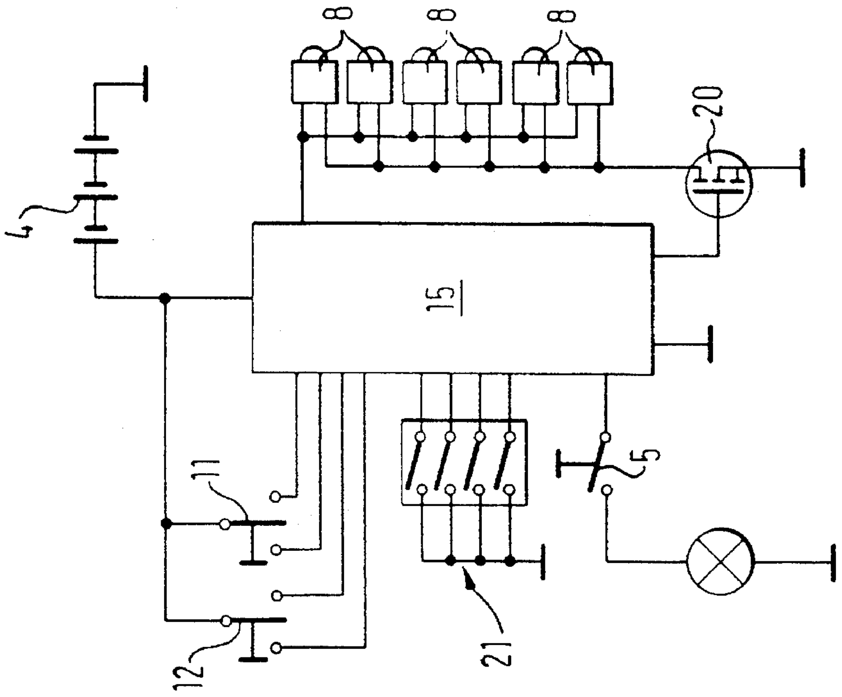
FIG. 3 is an electric circuit diagram of the switching elements used in the hand lamp.

FIGS. 3A and 3B show the electric circuit of the hand lamp and the control circuit of a plate test stand, respectively. First and second spring-loaded flip switches 11, 12 are electrically connected to power source 4 housed in housing 1. When first and second switches 11, 12 are pressed, switching fingers of first and second switches 11, 12 are brought into contact with first and second line contacts, respectively. First and second switches 11, 12 have three switching functions, ie. on-right, off, and an on-left. The output lines of first and second switches 11, 12 lead to the IC element 15. The simple push switch 5 connects the bulb used as light source (symbolically shown as a circle with a cross therein) to the IC element 15, which has a first output leading to a transistor 20 and a second output leading to the transmitting elements 8. The output of the transistor 20 is also connected to the transmitting elements 8, and an encoding element 21 is connected to the IC element 15.

As shown in FIG. 3B, the electric control circuit of the test stand includes a plurality of receivers 22 designed to receive waves emitted by the transmitting elements 8 and electrically connected to a control unit 23. An encoder 24 is associated with control unit 23. Encoder 24 is adapted to the encoder 21 of a hand lamp and is designed to only receive the pulses emitted by the transmitting elements of that particular hand lamp. From the control unit 23 various output lines lead to a main switch 25 of the test stand and to a plurality of electromagnetic control valves 26 which are provided in the feed and discharge lines of the hydraulic control cylinders of plate-type test stand.

The invention is not restricted to the exemplary embodiments shown. Thus, further transmitting elements may be disposed for instance in the floor plate of the housing or also on the front edge of the housing sleeve 9 surrounding the reflector 7. Moreover, additional switches with corresponding control elements may be integrated in the control circuit, facilitate remote control of brake test stands. Transmission of the control signals is conveniently effected by radio, infra-red light or ultrasound.

I claim:

1. A hand lamp for examining a motor vehicle on a test stand having remotely controllable elements, said hand lamp comprising:

a body;

a power source housed in the body;

a light housed in the body and coupled to the power source;

a first switching element coupled to the light and the power source to selectively provide power to the light;

a control circuit for generating control signals for controlling the remotely controllable elements in the automobile test stand;

transmitting elements coupled to the control circuit to transmit the control signals to the test stand; and a second switching element coupled to the control circuit and the power source to selectively provide power to the control circuit.

2. The system of claim 1, wherein the control circuit includes an IC element.

3. The system of claim 1, wherein the control circuit includes an encoding element for modulating the control signals.

4. The system of claim 1, wherein the control signal is a radio wave.

5. The system of claim 1, wherein the control signal is an infrared wave.

6. The system of claim 1, wherein the control signal is an ultrasound wave.

7. An automobile test stand control system, comprising:

an automobile test stand having remotely controllable elements, a first control circuit for controlling the remotely controllable elements, and a receiver coupled to the control circuit to receive control signals; and an automobile inspection lamp comprising:

a body;

a power source housed in the body;

a light housed in the body and coupled to the power source;

a first switching element coupled to the light and the power source to selectively provide power to the light;

a second control circuit for generating control signals for controlling the first control circuit;

transmitting elements coupled to the second control circuit to transmit the control signals to the receiver of the first control circuit; and a second switching element coupled to the second control circuit and the power source to selectively provide power to the second control circuit.

8. The system of claim 7, wherein the second control circuit includes an IC element.

9. The system of claim 7, wherein the first and second control circuits include first and second encoding elements, respectively, for modulating the control signals.

10. The system of claim 7, wherein the control signal is a radio wave.

11. The system of claim 7, wherein the control signal is an infrared wave.

12. The system of claim 7, wherein the control signal is an ultrasound wave.

* * * * *